(12) United States Patent
Abarotin et al.

(10) Patent No.: US 12,138,964 B2
(45) Date of Patent: Nov. 12, 2024

(54) TRUCK TIRE TREAD WITH J SHAPED SIPE

(71) Applicants: Victor Abarotin, Greer, SC (US); Daniel McEachern Hicks, Greenville, SC (US); Compagnie Generale des Etablissements Michelin, Clermont-Ferrand (FR)

(72) Inventors: Victor Abarotin, Greer, SC (US); Daniel McEachern Hicks, Greenville, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 171 days.

(21) Appl. No.: 17/781,516

(22) PCT Filed: Dec. 19, 2019

(86) PCT No.: PCT/US2019/067367
§ 371 (c)(1),
(2) Date: Jun. 1, 2022

(87) PCT Pub. No.: WO2021/126202
PCT Pub. Date: Jun. 24, 2021

(65) Prior Publication Data
US 2023/0001745 A1   Jan. 5, 2023

(51) Int. Cl.
*B60C 11/12* (2006.01)
(52) U.S. Cl.
CPC ........ *B60C 11/1218* (2013.01); *B60C 11/124* (2013.01); *B60C 11/1281* (2013.01); *B60C 2011/1213* (2013.01); *B60C 2200/06* (2013.01)

(58) Field of Classification Search
CPC ............... B60C 11/124; B60C 11/1281; B60C 11/1218
See application file for complete search history.

(56) References Cited

U.S. PATENT DOCUMENTS

| 2,246,479 A | 6/1941 | Schrank |
| 6,116,310 A * | 9/2000 | Shinohara ............... B60C 11/13 152/902 |

(Continued)

FOREIGN PATENT DOCUMENTS

| CA | 2788247 A1 * | 10/2011 | ......... B60C 11/0306 |
| EP | 0810104 A1 | 12/1997 | |

(Continued)

OTHER PUBLICATIONS

English machine translation of JP-2000211321-A. (Year: 2000).*

(Continued)

*Primary Examiner* — Robert C Dye
(74) *Attorney, Agent, or Firm* — Neal P. Pierotti

(57) ABSTRACT

A tread (10) for a heavy truck tire is provided that has an upper surface for engaging the ground, a leading edge, and a trailing edge forward of the leading edge in a rolling direction. The tread also has a J shaped sipe (30) that has a main portion (32) that extends from the upper surface. The main portion (32) has an opening at the upper surface and a bottom end (36) opposite the opening in a radial direction. A curved portion (38) extends from the bottom end (36) and has a bottom curved wall (40) that has a radius (r1). The curved portion (38) extends from the bottom end (36) forward in the rolling direction (24), and has a curved portion end (42).

3 Claims, 6 Drawing Sheets

(56) References Cited

U.S. PATENT DOCUMENTS

| | | | |
|---|---|---|---|
| 6,213,181 B1 * | 4/2001 | Janajreh | B60C 11/1346 |
| | | | 152/209.27 |
| 2008/0230161 A1 | 9/2008 | Ishiyama | |
| 2018/0281328 A1 * | 10/2018 | Collett | B60C 11/1281 |

FOREIGN PATENT DOCUMENTS

| | | | | | |
|---|---|---|---|---|---|
| JP | 01101205 A | * | 4/1989 | | B60C 11/1281 |
| JP | 2000211321 A | * | 8/2000 | | B60C 11/125 |
| JP | 2002225512 A | | 8/2002 | | |
| JP | 2008007047 A | | 1/2008 | | |
| JP | 2012076557 A | | 4/2012 | | |
| JP | 2017128230 A | | 7/2017 | | |
| WO | 2011131381 A1 | | 10/2011 | | |

OTHER PUBLICATIONS

English machine translation of JP-01101205-A (Year: 1989).*
European Patent Office, International Search Report dated Jun. 18, 2020, pp. 1-15 (included), European Patent Office, Rijswijk, The Netherlands.

* cited by examiner

TRUCK TIRE TREAD WITH J SHAPED SIPE

CROSS-REFERENCE TO RELATED APPLICATIONS

The present application is a 35 U.S.C. § 371 application of PCT/US2019/067367 filed on Dec. 19, 2019 and entitled "Truck Tire Tread with J Shaped Sipe." PCT/US2019/067367 is incorporated by reference herein in its entirety for all purposes.

FIELD OF THE INVENTION

The subject matter of the present invention relates to a truck tire with tread having a J shaped sipe. More particularly, the present application involves a truck tire tread that is directional in which the J shaped sipe is oriented relative to the rolling direction to reduce or eliminate abnormal wear.

BACKGROUND OF THE INVENTION

Manufacturers of heavy commercial vehicle tires have made progress in developing tire architectures and tire materials that allow increase in the wear resistance of tire treads and the reduction of the rolling resistance of tires while at the same time improving their level of grip and resistance to road hazard. Irregular tread wear (also called "uneven wear" or "abnormal wear") is a great concern for heavy commercial vehicle tires as it can progressively induce tire vibrations that become sensed by the driver through the steering wheel. It can also make for a poor looking wear pattern. Both of these undesired effects often lead to the tire being removed from service at an early stage of its wear life. Generally, the more the tire is put through a slow-wearing usage, the more irregular wear is affecting the removal mileage. This is why resistance to irregular wear is of paramount importance for truck tires in so-called long haul steer, drive, and trailer usage.

It is known to include structural features in tires to achieve certain performance benefits. For instance, thin cuts into the tread known as sipes can be used in tires in order to improve performance on snow, ice, and water, and to help manage heat generated in the tire. However, the placement of sipes into the tread may cause cracks to be formed at the bottom end of the sipe. In order to address this cracking, it is known to put teardrops into the bottom of the sipes. A teardrop is an enlargement of the sipe bottom and is typically circular in cross-sectional shape which increases the radius of the sipe bottom to reduce stress concentrations and minimize the risk of crack initiation. Sipe bottom cracking may occur more often in the shoulder area of the tire, but it can occur anywhere sipes are present on the tread. For drive axle tires with sipes in the shoulder, a rather large teardrop is needed to sufficiently reduce the cracking due to the torque acting on the tire. However, such a large diameter teardrop, possibly 4-5 millimeters in diameter, can cause other problems with the shoulder such as creating unwanted compression on an edge of the block at the sipe due to the undercut formed by the large teardrop. This undercut may lead to abnormal wear at the edge of the block. Although ways of stopping cracks from forming in one part of the sipe are known, they may in turn cause abnormal wear at another portion of the tire. As such, there remains room for variation and improvement in the design of sipes in tire treads.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of identical or similar reference numerals in different figures denotes identical or similar features.

DETAILED DESCRIPTION OF THE INVENTION

Figure 1:
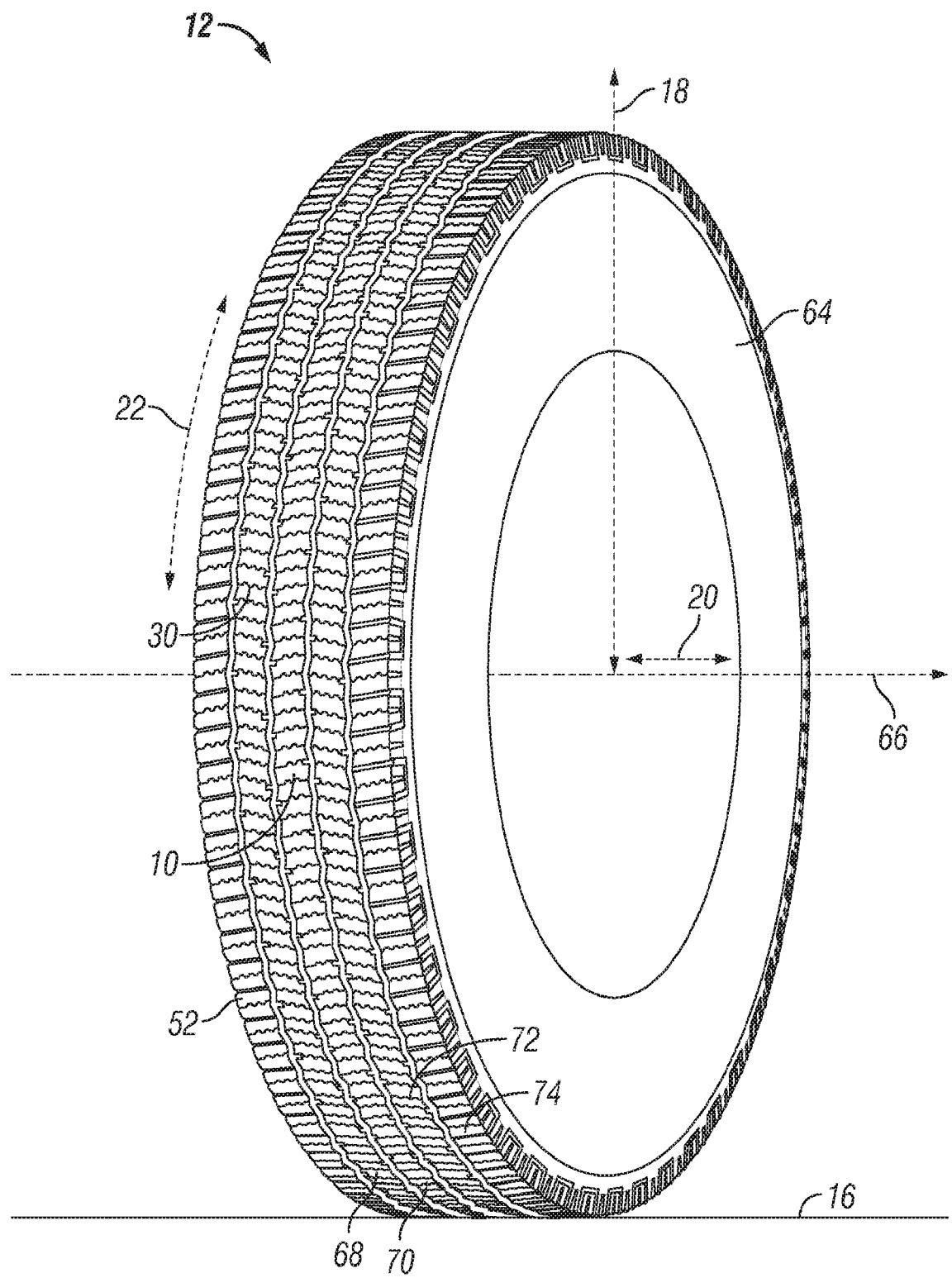
FIG. 1 is a perspective view of a heavy truck tire.

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

The present invention provides for a tread 10 for a heavy duty truck tire 12 that has a J shaped sipe 30 that is oriented relative to the rolling direction 24 of the tread 10 so that abnormal wear at the trailing edge 26 of the J shaped sipe 30 of the tread 10 is reduced or eliminated. The J shaped sipe 30 has a main portion 32 that extends into the tread 10, and a curved portion 38 that extends from the main portion 32. The curved portion 38 extends under the trailing edge 26 such that the J shaped sipe 30 is oriented completely forward or substantially forward relative to the rolling direction 24. A teardrop 44 may be located at a curved portion end 42 of the curved portion 38. The configuration of the J shaped sipe 30 allows for a sipe to be put into the tread 10 to achieve the sipe benefits while reducing or eliminating abnormal wear that normally comes from the presence of sipes in tire tread 10. The curved portion 38 has a curved portion thickness $t_2$ that is a distance from the top curved wall 50 to the bottom curved wall 40 that is less than or equal to 1 millimeter that resists compression in the J shaped sipe 30 to reduce or eliminate this abnormal wear.

FIG. 1 shows a tire 12 that is a heavy duty truck tire 12. In this regard, the tire 12 is not designed for nor used with a car, motorcycle, or light truck (payload capacity less than 4,000 pounds), but is instead designed for and used with heavy duty trucks such as 18 wheelers, garbage trucks, or box trucks. The tire 12 may be a steer tire, a drive tire, a trailer tire, or an all position tire, although in a preferred embodiment the tire 12 is a drive tire. The tire 12 includes a carcass 64 onto which a tread 10 is disposed thereon. The central axis 66 of the tire 12 extends through the center of the carcass 64, and the axial direction 20, which can be called the width direction 20, of the tire 12 is parallel to the central axis 66. The radial direction 18 of the tire 12 can be referred to as the thickness direction 18 and is perpendicular to the central axis 66. The tread 10 is located farther from the central axis 66 in the radial direction 18 than the carcass 64. The tread 10 extends all the way around the carcass 64 in the circumferential direction 22 of the tire 12 and circles the central axis 66 360 degrees. The circumferential direction 22 can also be referred to as the longitudinal direction 22 of the tread 10.

The tread 10 features five ribs 52, 68, 70, 72, 74 that are separated by four longitudinal grooves that extend in the circumferential direction 22 completely about the tire 12. The five ribs 52, 68, 70, 72, 74 can be classified as a center rib 70, two intermediate ribs 68, 72, and two shoulder ribs 52, 74. The shoulder ribs 52, 74 are on the ends of the tread 10 in the axial direction 20, but in some embodiments sacrificial ribs could be located even more outboard than the shoulder ribs 52, 74. The intermediate ribs 68, 72 are just inboard of the shoulder ribs 52, 74 and are separated therefrom by shoulder grooves that extend in the circumferential direction 22. The center rib 70 is between the two intermediate ribs 68, 72 in the axial direction 20. Although five ribs 52, 68, 70, 72, 74 are shown any number of ribs 52, 68, 70, 72, 74 can be present in other exemplary embodiments.

The ribs 52, 68, 70, 72, 74 can each be made up of a number of tread blocks that can have various shapes, sizes, and configurations. The inclusion of these architectural features gives the tread 10 different performance properties in use. The tread 10 may include certain structural features that can reduce abnormal wear. One such structural feature may be sipes 30 that extend across the tread blocks of the ribs 52, 68, 70, 72, 74 in the axial direction 20. The tread 10 has a first tread edge and an oppositely disposed second tread edge in the axial direction 20. The rolling tread width of the tread 10 extends from one edge to the other edge and is the portion of the tread 10 that is designed to engage the ground 16 when the tire 12 is new before any tread 10 wear has occurred. The tire 12 can be a brand new tire with the carcass 64 and tread 10 formed at the same time with both being brand new. Alternatively, the tread 10 may be provided as a retread band that is newly formed and then subsequently attached to an existing, used carcass 64 through a retread process.

Figure 2:
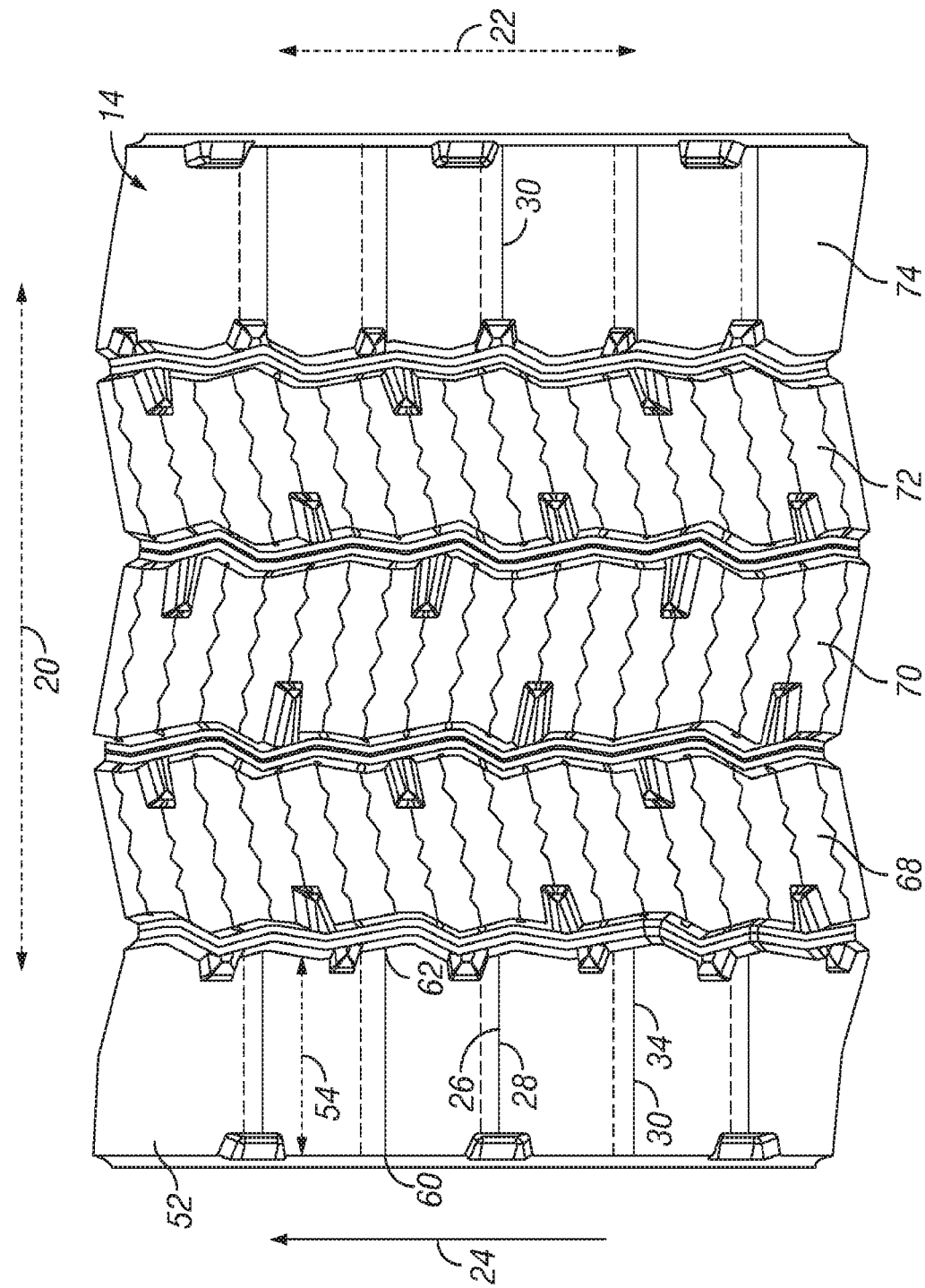
FIG. 2 is a top plan view of a portion of tread in accordance with one exemplary embodiment.

FIG. 2 is a top plan view of a section of the tread 10 in accordance with one exemplary embodiment. The tread 10 may be incorporated into any tire 12 in a tractor trailer, but preferably the tread 10 is incorporated into a drive tire 12 of a tractor trailer. The tread 10 includes five ribs being two shoulder ribs 52, 74, two intermediate ribs 68, 72, and center rib 70. The intermediate 68, 72 and shoulder ribs 52, 74 are separated from one another by open longitudinal grooves. Likewise, the center rib 70 is separated via two open longitudinal grooves from the intermediate ribs 68, 72. The tread 10 is a directional tread 10 in that it is designed for primary rolling in the rolling direction 24. In this regard, various tread 10 features are provided to give desired performance properties when the tire 12 is rolling in the rolling direction 24 as opposed to rolling opposite to the rolling direction 24.

The tread 10 includes J shaped sipes 30 in two of the ribs 52 and 74 that extend across the entire axial widths of these ribs 52 and 74. In this regard, the shoulder rib 52 has an entire axial width 54 that extends from the left tread edge to the open groove the shoulder rib 52 shares with the intermediate rib 68 in the axial direction 20. The J shaped sipes 30 in the shoulder rib 52 extend across the entire axial width 54 and open into the outside surface of the tread edge and the longitudinal groove. In other embodiments, the J shaped sipes 30 extend across less than the entire axial widths of the ribs 52, 74. Further, any number of J shaped sipes 30 can be included in the ribs 52, 68, 70, 72, 74, and although shown as being in only two of the ribs 52, 74 the J shaped sipes 30 can be absent from any of the ribs 52, 68, 70, 72, 74 and can be located in any one or ones of the ribs 52, 68, 70, 72, 74. Although the J shaped sipe 30 can be located any of the ribs 52, 68, 70, 72, 74, the J shaped sipes 30 are preferably located in the shoulder ribs 52 and 74.

Figure 3:
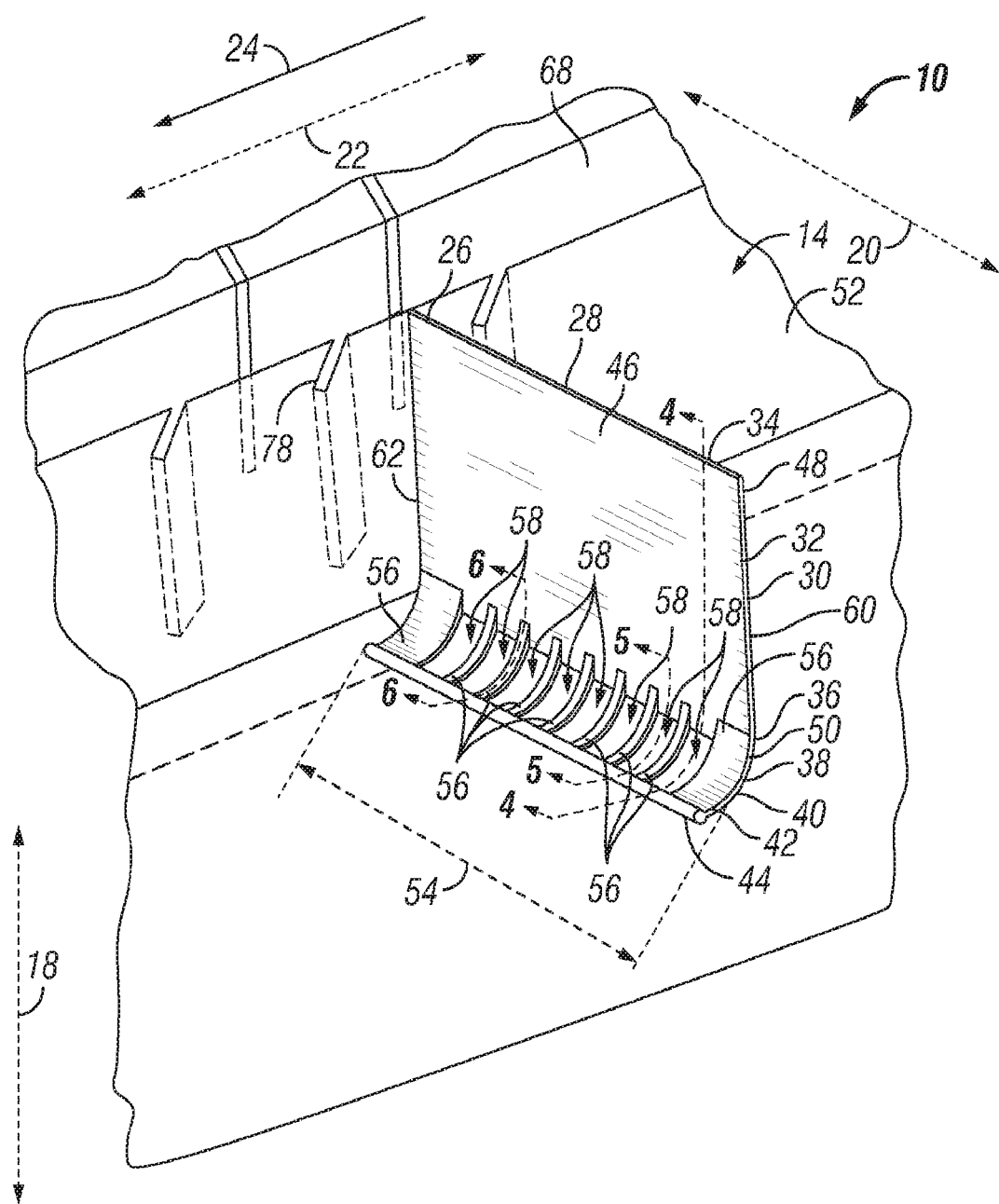
FIG. 3 is a perspective view of a portion of the tread of FIG. 2.

FIG. 3 shows a portion of the tread 10 of FIG. 2 in perspective view. The J shaped sipe 30 has a first axial end 60 located at the tread 10 edge, and the J shaped sipe 30 is open at the first axial end 60. The J shaped sipe 30 has a second axial end 62 at the opposite end in the axial direction 20, and the second axial end 62 is open at the shoulder groove that bounds the shoulder rib 52. The entire axial width 54 extends from the first axial end 60 to the second axial end 62 in the axial direction 20. The J shaped sipe 30 extends down from the upper surface 14 into the tread 10 in the radial direction 18. The J shaped sipe 30 has a main portion 32 that extends in the radial direction 18 into the tread 10 until transitioning into a curved portion 38. The curved portion 38 is broken up into a plurality of curved thicker gapped zones 56 and curved thinner gapped zones 58 across the width of the curved portion 38 along the axial direction 20. Eight curved thinner gapped zones 58 and nine curved thicker gapped zones 56 are present and alternate with one another across the axial width of the J shaped sipe 30. However, any number may be present in other embodiments. The curved thicker gapped zones 56 are present at the first axial end 60 and the second axial end 62. The zones 56 at the axial ends 60 and 62 are larger in width in the axial direction 20 than any of the other zones 56 in the J shaped sipe 30, and need not be present in other exemplary embodiments. The curved thinner gapped zones 58 are as a group closer to the axial center of the J shaped sipe 30 in the axial direction 20 than the zones 56. The widths of the zones 58 are wider than the width of zones 56 in the axial direction 20 with the possible exception of the two zones 56 at the axial ends 60, 62. The curved thinner gapped zones 58 may extend across more than 50% of the width of the J shaped sipe 30 in the axial direction 20. In this regard, more than 50% of the width of the J shaped sipe 30 includes zones 58, and less than 50% of the width of the J shaped sipe 30 includes zones 56. Any number of zones 56, 58 can be present, and they may have the same size and cross-sectional shape as one another, or can be different from one another. More than 50% of the entire axial width 54 includes a curved portion 38 that has a curved portion thickness $t_2$ that is the smallest curved portion thickness $t_2$ of the J shaped sipe 30.

The driving torque acting on tires 12 causes the crack to form "behind" the sipe in the direction opposite to the rolling direction 24, causing crack propagation underneath the leading edge 28. Since the orientation of the crack propagation is defined by the driving torque and consequently by the rolling direction 24, the bottom of the J shaped sipe 30 can be designed to reduce or minimize cracking at this location. The curved portion 38 creates a void under the trailing edge 26 of the J shaped sipe 30 which decrease the compression stiffness at the trailing edge 26 of the block which in turn decreases the contact stress as the tire 12 rolls through contact. This decrease may be enough to cause an increase in wear rate at the trailing edge 26 and eventually generate abnormal wear. To limit this compression, the curved portion 38 may have a thickness less than the rest of the J shaped sipe 30 such as the main portion 32 and the teardrop 44. The thickness $t_2$ of the curved portion 38 may be 0.2 millimeters which is the preferred thickness $t_2$. This thickness $t_2$ can be along the entire axial width 54, or may be along just portions of the entire axial width 54 for manufacturability. The teardrop 44 may provide additional reinforcement at the bottom tip of the J shaped sipe 30 and reduce the risk of cracking at the tip.

Figure 4:
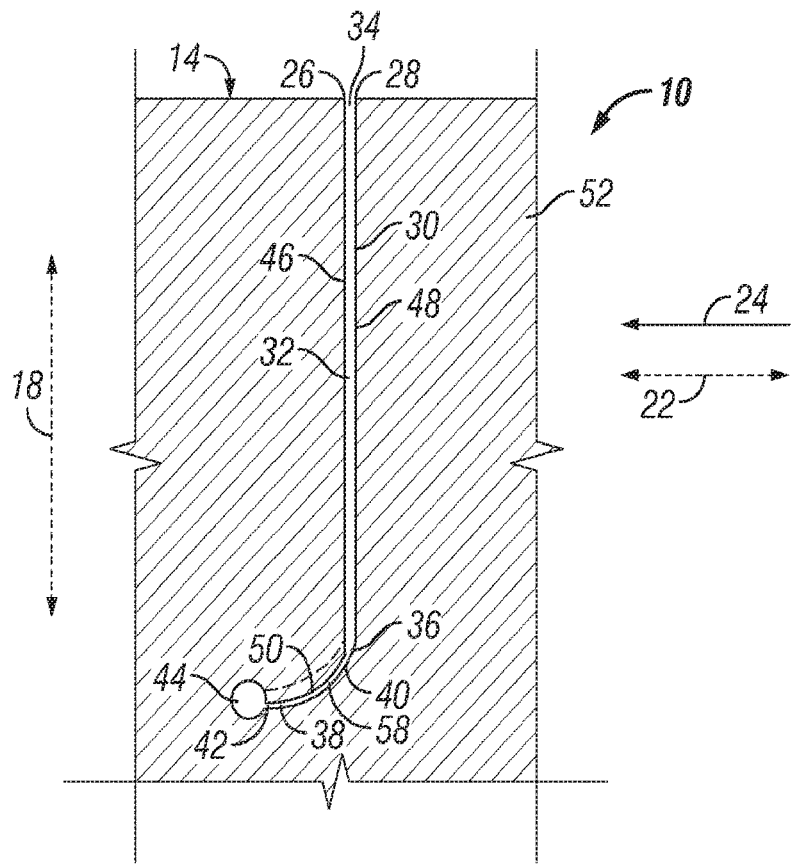
FIG. 4 is a cross-sectional view taken along line 4-4 of FIG. 3.

FIG. 4 is a cross-sectional view taken along line 4-4 of FIG. 3 which goes through one of the curved thinner gapped zones 58. The J shaped sipe 30 has a main portion 32 that has an opening 34 located at the upper surface 14. The opening 34 cuts the shoulder rib 52 into a pair of blocks one being forward of the opening 34, and the other being rearward of the opening 34. As the tread 10 rotates into the contact patch with the ground 16 in the rolling direction 24, the block forward of the opening 34 enters the contact patch first and engages the ground 16 before the block rearward of the opening 34. A trailing edge 26 of the block forward of the opening 34 is defined by the upper surface 14 and the main portion 32 at the opening 34. A leading edge 28 of the block rearward of the opening 34 enters the contact patch after the trailing edge 26, but is called the leading edge 28 because it is the leading edge of the block that is rearward of the opening 34. The trailing edge 26 and the leading edge 28 can be edges that are lines, or edges that include some amount of planar or curved surface as the transition of the upper surface 14 to the main portion 32 may be a sharp corner, curved, or have any type of transitional shape. The trailing and leading edges 26, 28 may be a portion of the J shaped sipe 30 but could also be a portion of the sipe 30 along with the upper surface 14, an interior surface of the tread 10, or any combination. The edges 26, 28 are still a part of the tread 10.

The main portion 32 of the J shaped sipe 30 extends from the opening 34 in the radial direction 18 and is the longest portion of the J shaped sipe 30. The main portion 32 is defined by a forward wall 46 and a rearward wall 48 that are both planar, but need not be in other embodiments of the tread 10. The main portion 32 extends in the radial direction 18 until reaching a bottom end 36. The main portion 32 is thus defined from the opening 34 to the bottom end 36. The curved portion 38 extends from the bottom end 36 into the tread 10 to a curved portion end 42. The transition from the main portion 32 to the curved portion 38 at the bottom end 36 may be visible in that the size of the J shaped sipe 30 changes at this point. If the relative thicknesses of the main portion 32 and the curved portion 38 are the same then the bottom end 36 can be identified as being the location when the J shaped sipe 30 begins to curve to thus signify the start of the curved portion 38. The J shaped sipe 30 is shown as being oriented in the radial direction 18, but in other embodiments the J shaped sipe 30 can be inclined relative to the radial direction 18 so that it extends at an angle to the radial direction 18 either forward or rearward. The J shaped sipe 30 can be angled from 5-30 degrees, from 20-35 degrees, or up to 45 degrees to the radial direction 18 in accordance with certain exemplary embodiments.

The curved portion 38 extends a length that is less than that of the main portion 32. The curved portion 38 extends both in the radial direction 18 and the circumferential direction 22. The curved portion 38 has a bottom curved wall 40. The radius of the bottom curved wall 40 can be the same along its entire length, or there may be multiple radii of curvature of the bottom curved wall 40 from the bottom end 36 to the curved portion end 42. The main portion 32 and the curved portion 38 may thus roughly form the shape of a J so that the sipe 30 can be referred to as a J shaped sipe 30. The bottom curved wall 40 is concave in shape.

The curved portion 38 is oriented relative to the main portion 32 so that the curved portion 38 extends completely, or at least partially, in the rolling direction 24 forward of the main portion 32. The curved portion 38 may be located under the trailing edge 26 such that the trailing edge 26 and the curved portion 38 may share the same location in the circumferential direction 22 but be separated from one another in the radial direction 18. A teardrop 44 extends from the curved portion end 42 and forms the terminal end of the J shaped sipe 30. The teardrop 44 may be spaced from and not under the trailing edge 26 such that the teardrop 44 is forward of the trailing edge 26 in the rolling direction 24. The teardrop 44 may be arranged so that no portion of the teardrop 44 and the trailing edge 26 share the same position in the circumferential direction 22. Likewise, the teardrop 44 may be completely forward of the main portion 32 such that no part of the teardrop 44 or the main portion 32 share a common position in the circumferential direction 22. The teardrop 44 does not extend as much into the tread 10 as does the main portion 32. The teardrop 44 has a circular cross-sectional shape but can have any cross-sectional shape in accordance with other exemplary embodiments. The design of the J shaped sipe 30 may allow for a larger teardrop 44 diameter $d_2$ to be used while still minimizing or reducing crack formation at the tip.

Figure 5:
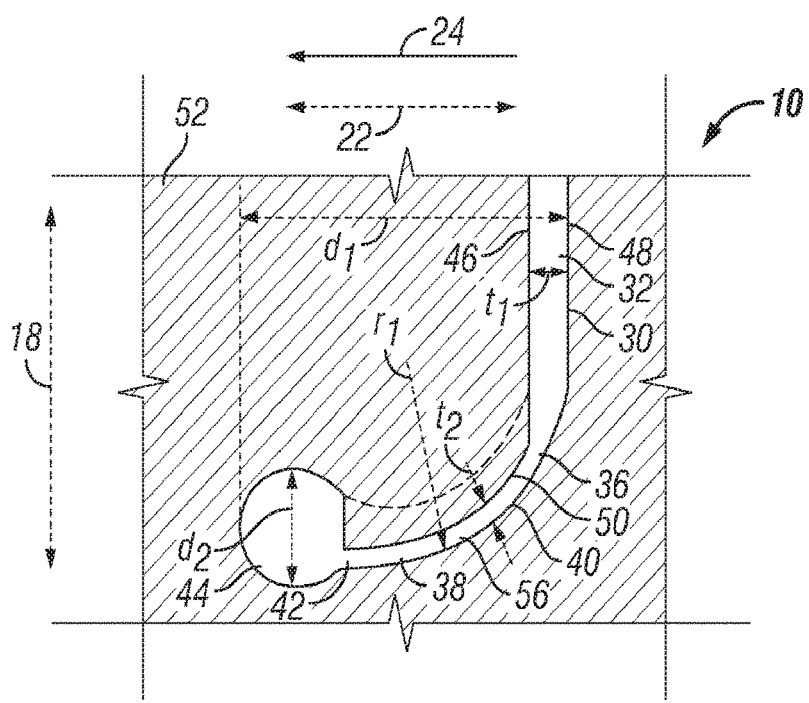
FIG. 5 is a cross-sectional view taken along line 5-5 of FIG. 3.

FIG. 5 is a cross-sectional view along line 5-5 of FIG. 3 that illustrates but a portion of the J shaped sipe 30 at its bottom. FIG. 5 is taken through a curved thinner gapped zone 58 of the J shaped sipe 30. The main portion 32 has a thickness $t_1$ that is defined as the distance from the forward wall 46 to a directly opposite facing point of the rearward wall 48. The curved portion 38 has a top curved wall 50 that directly faces the bottom curved wall 40, and a consistent thickness $t_2$ of the curved portion 38 is established and defined between these two walls 38, 40. The bottom curved wall 50 has a radius of curvature $r_1$. The bottom curved wall 40 is distinguished from the top curved wall 50 in that the bottom curved wall 40 is deeper into the tread 10 and thus closer to the central axis 66 in the radial direction 18 than the top curved wall 50. The top curved wall 50 is convex in shape.

The teardrop 44 has a circular cross-sectional shape and has a diameter designated as $d_2$. An extension distance $d_1$ of the J shaped sipe 30 is defined as the distance from the rearward wall 48 to the farthest point of the teardrop 44 from the rearward wall 48. The extension distance $d_1$ may be measured so that it is parallel to the main portion thickness $t_1$. The various distances, diameter and radius can be measured by taking a cross-sectional view of the J shaped sipe 30, and this cross-sectional view may be through a portion of the J shaped sipe 30 that features the smallest curved portion thickness t2. When the J shaped sipe 30 is configured so that it has the above described distances, diameter, and radius $t_1$, $t_2$, $r_1$, $d_1$, $d_2$ it can be made according to the following parameters:

0.2 millimeters ≤ $t_1$ ≤ 2.0 millimeters;
0.0 millimeters ≤ $t_2$ ≤ 1.0 millimeters;
1.0 millimeters ≤ $r_1$ ≤ 10 millimeters;
$t_1 \leq d_2 \leq (4.0 \times t_1)$;
$r_1 \leq d_1 \leq (1.1 \times (r_1 + d_2))$;
$t_2 \leq t_1$.

The configuration of the J shaped sipe 30, and the previously noted dimensional parameters may be measured when the tread 10 is at rest and not subjected to driving forces. The J shaped sipe 30 may be at the top of the tire 12 when being measured. It should be noted that the immediately described parameters include embodiments where the curved portion thickness $t_2$ is 0.0 millimeters. This can be accomplished if the curved portion 38 is formed via a very thin cut through the rubber of the shoulder rib 52. For example, if the curved portion 38 were formed via cutting instead of molding. With a 0.0 millimeter curved portion thickness $t_2$, the top curved wall 50 touches the bottom curved wall 40 such that there is no spatial separation between these walls 40, 50 although they are cut. When the tread 10 is subjected to forces and put into the contact patch, the J shaped sipe 30 could be deformed so that there is a spatial separation between the walls 40, 50.

In accordance with one exemplary embodiment, the J shaped sipe 30 is arranged so that $t_1=0.6$ millimeters, $t_2=0.2$ millimeters, $r_1=3.0$ millimeters, and $d_2=1.5$ millimeters. With these dimensions, $d_1$ may be from 3 millimeters to 4.95 millimeters. Such dimensions may be optimal dimensions for performance and manufacturability of the J shaped sipe 30.

Figure 6:
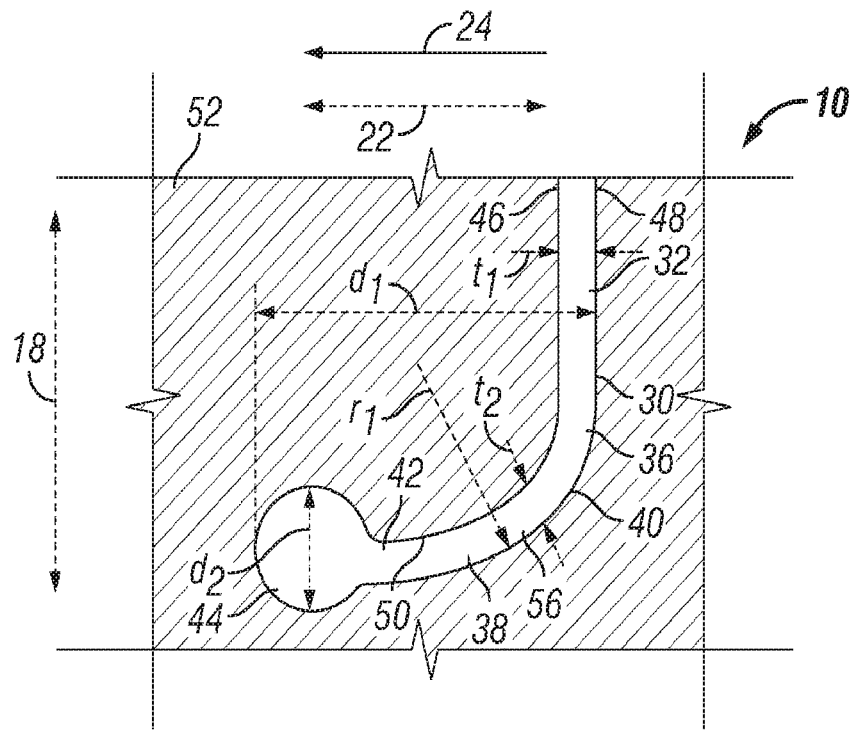
FIG. 6 is a cross-sectional view taken along line 6-6 of FIG. 3.

The curved thicker gapped zone 56 of the J shaped sipe 30 is illustrated with reference to FIG. 6 which is a cross-sectional view taken along line 6-6 of FIG. 3 showing the bottom portion of the J shaped sipe 30. The curved portion 38 at the curved thicker gapped zone 56 has a larger curved portion thickness $t_2$ than at the curved thinner gapped zone 58. In zone 56, the curved portion thickness $t_2$ may be equal to the main portion thickness $t_1$. In some embodiments, there are no distinct zones 56 and 58, but the curved portion 38 has the same curved portion thickness $t_2$ across the entire axial width 54. This thickness $t_2$ in these embodiments may be 0.2 millimeters or may be from 0.1-1.0 millimeters. Applicant has discovered that the dimension $t_2$ that is very small (on the order of up to 1.0 millimeters) provides material in this area that limits compression and thus prevents abnormal wear at the trailing edge 26. One reason why different zones 56 and 58 are present is due to manufacturability. The J shaped sipe 30 is formed by a sipe forming feature in the mold. A very thin sipe forming feature that can form the very thin, curved portion 38 may break when the very thin sipe forming feature is extracted from the tread 10 during molding. To help prevent this, the sipe forming feature can be made thicker with the inclusion of thicker portions. These thicker portions make the sipe forming feature stronger but also form the curved thicker gapped zones 56. Although the curved thicker gapped zones 56 are formed in the J shaped sipe 30, they may still allow the J shaped sipe 30 to achieve abnormal wear prevention or minimization since the J shaped sipe 30 will have the curved thinner gapped zones 58 that add material in the area of the curved portion 38 to resist abnormal wear at the trailing edge 26. Aside from having a larger curved portion thickness $t_2$ in zones 56, the cross-sectional shape and the rest of the size of the J shaped sipe 30 is the same. Although shown with the two different zones 56, 58, any number of differently sized zones are possible in other arrangements, and embodiments exist in which only a single zone is present in which the size of the J shaped sipe 30 is the same across the entire axial width 54.

The J shaped sipe 30 is arranged so that added material is present just forward of the main portion 32 and thus under and/or forward of the trailing edge 26. This added material can be present in the curved portion 38 to reduce compression of the curved portion 38 during rolling of the tread 10 and prevents or minimizes abnormal wear. This arrangement results in less or no abnormal wear at the trailing edge 26. When saying the curved portion 38 has added material it is to be understood that the added material simply means that the curved portion 38 has a thickness that is small, and in most cases the thickness of the curved portion 38 is smaller than the thickness of the main portion 32. This increased material in the J shaped sipe 30 functions as a compression limiter that reduces the drop in stress at the trailing edge 26 which minimizes the risk of abnormal wear. The large bottom curved wall radius $r_1$ helps minimize or eliminate cracking at the bottom.

Figure 7:
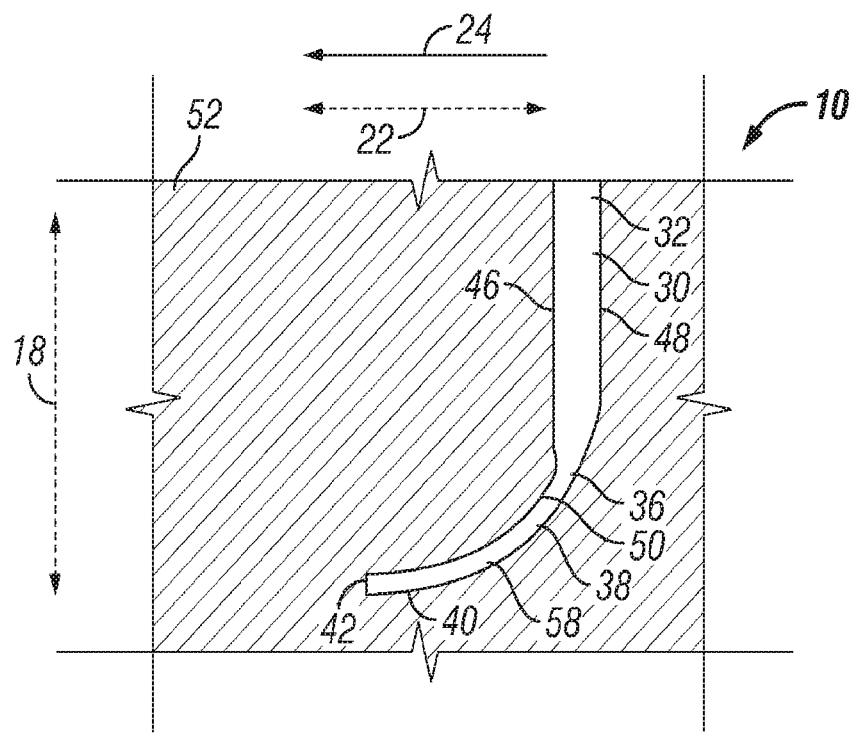
FIG. 7 is a cross-sectional view of a J shaped sipe in accordance with another exemplary embodiment.

FIG. 7 is an alternate embodiment of the J shaped sipe 30 in which a teardrop 44 is not present. The J shaped sipe 30 again has a main portion 32 that extends into the tread 10 and terminates at a bottom end 36. The curved portion 38 has curved bottom walls 40 and top walls 50 that extend from the bottom end 36 in the radial direction 18 and the axial direction 20 so as to be located forward of the main portion 32 in the rolling direction 24. The curved portion 38 terminates at a curved portion end 42 that is at the farthest distance from the main portion 32 in the circumferential direction 22. A teardrop 44 is not present at the end of the curved portion 38 and is not present at all within the J shaped sipe 30.

Figure 8:
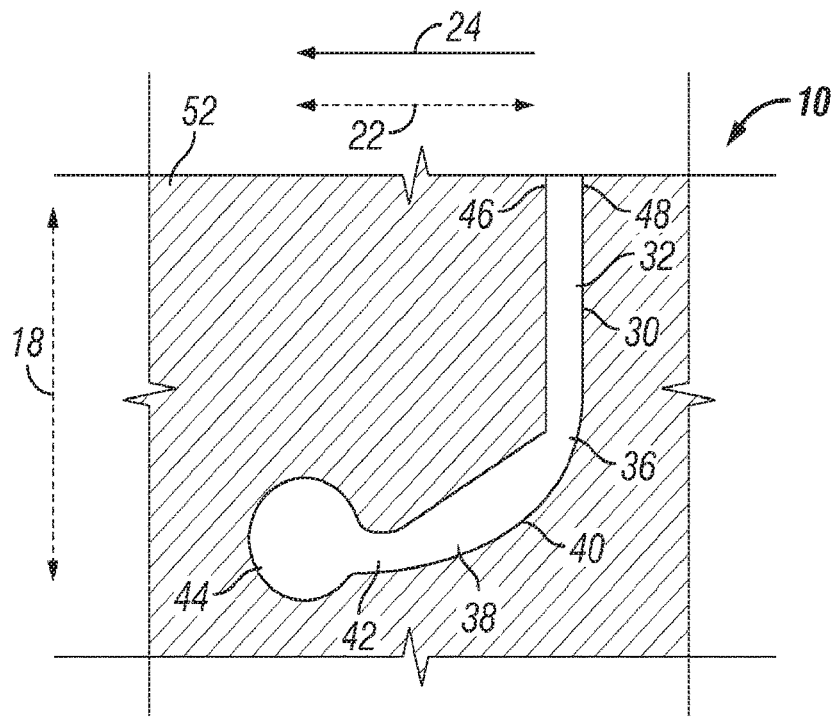
FIG. 8 is a cross-sectional view of a J shaped sipe in accordance with yet another exemplary embodiment.

Another alternate embodiment of the J shaped sipe 30 is illustrated in FIG. 8 that shows the sipe 30 substantially as previously discussed. The cross-sectional view in FIG. 8 is through the curved thicker gapped zone 56. The top curved wall 50 in the curved thicker gapped zone 56 is not present opposite to the bottom curved wall 40. Instead, the top wall of the curved portion 38 has a planar surface and extends at an angle from the forward wall 46. The top wall of the curved portion 38 may be provided in a variety of shapes and is not limited to being a convex curved wall 50. The curved thinner gapped zone 58 will have a top curved wall 50 in the J shaped sipe 30 of FIG. 8.

Figure 9:
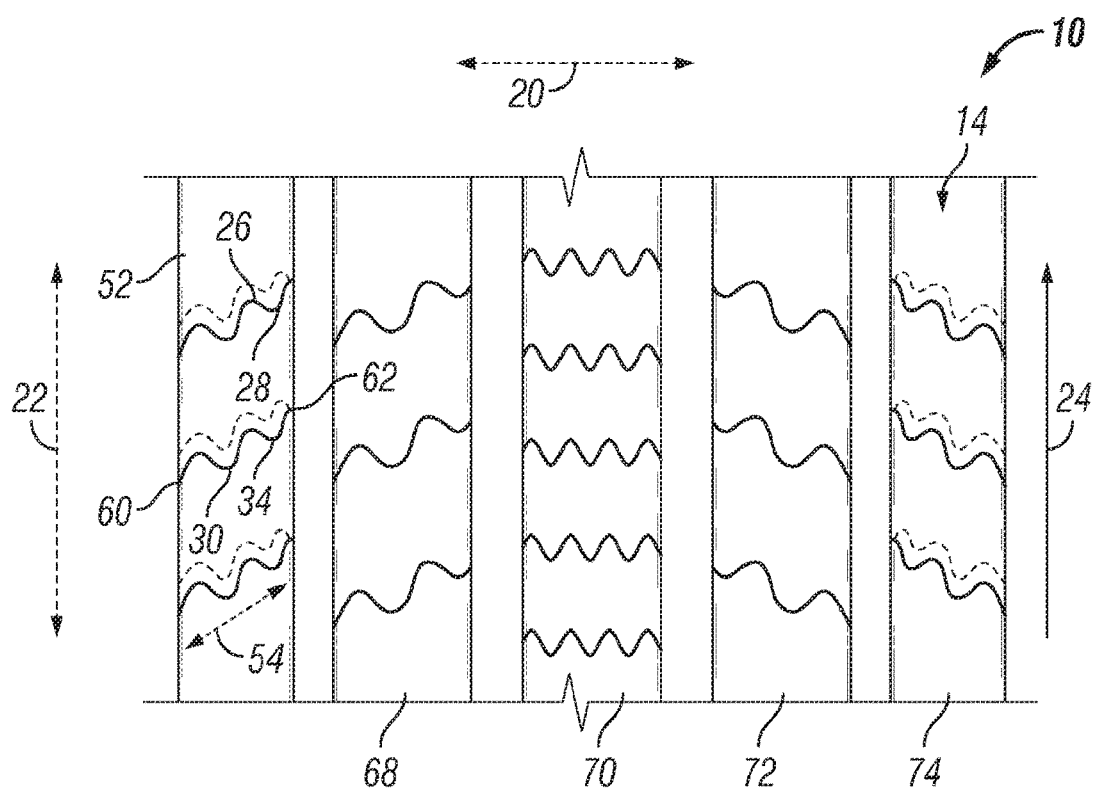
FIG. 9 is a top plan view of a portion of tread that has angled J shaped sipes in accordance with yet another exemplary embodiment.

FIG. 9 shows an alternate embodiment of the tread 10 in which five ribs 52, 68, 70, 72 and 74 are present. The J shaped sipes 30 are present in the shoulder ribs 52 and 74, but there are no J shaped sipes 30 in the intermediate ribs 68 and 72, and there are no J shaped sipes 30 in the center rib 70. The ribs 68, 72 and 70 may have sipes in them, but the sipes in them are not J shaped sipes 30 in the illustrated embodiment. The J shaped sipes 30 have entire axial widths 54 that extend across the entire widths of the shoulder ribs 52, 74 in the axial direction 20. The J shaped sipes 30 have wavy main portions 32, wavy curved portions 38, and wavy teardrops 44. Additionally, instead of extending completely in the axial direction 20, the J shaped sipes 30 are angled relative to the axial direction 20 so that they do not extend at a zero degree angle relative to the axial direction 20. The opening 34 of the main portion 32 is angled relative to the axial direction 20, and the curved portions 38 are likewise angled relative to the axial direction 20 and extend so as to be forward of the opening 34 in the circumferential direction 22 relative to the rolling direction 24. The main portion 32 although shown as being wavy, can have any shape such as straight, zig-zag, inclined, or curved in the axial direction 20 and/or the radial direction 18. Likewise, the curved portions 38 and the teardrops 38 need not always be straight or wavy, but can have various shapes in accordance with different exemplary embodiments.

The bottom curved wall 40 can be the same distance from the upper surface 14 in the radial direction 18 along the entire axial width 54. Alternatively, this distance could vary along some or all of the entire axial width 54. In a similar manner, the top wall 50 could have a different distance, or have the same distance, to the upper surface 14 in the radial direction 18 along the entire axial width 54.

While the present subject matter has been described in detail with respect to specific embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be apparent.

What is claimed is:

1. A tread for a heavy truck tire, comprising:
   an upper surface that is configured for engaging ground, wherein the tread has a radial direction, an axial direction, and a circumferential direction, wherein the tread is directional such that the tread is configured for having a rolling direction that extends in the circumferential direction;
   a J shaped sipe, comprising:
   a trailing edge;
   a leading edge, wherein the trailing edge is forward of the leading edge in the rolling direction;
   a main portion that extends from the upper surface, wherein the main portion has an opening at the upper surface and a bottom end opposite the opening in the radial direction; and
   a curved portion that extends from the bottom end of the main portion, wherein the curved portion has a bottom curved wall that has a radius $r_1$, wherein the curved portion extends from the bottom end of the main portion forward in the rolling direction, wherein the curved portion has a curved portion end, wherein the curved portion has a top curved wall that faces the bottom curved wall wherein the curved portion has a curved portion thickness $t_2$ that is a distance from the top curved wall to the bottom curved wall and is less than or equal to 1 millimeter;
   wherein the J shaped sipe has a teardrop located at the curved portion end, wherein the teardrop has a circular cross-sectional shape;
   wherein the main portion is defined by a forward wall and a rearward wall that face one another, wherein the forward wall is forward of the rearward wall in the rolling direction, wherein a main portion thickness $t_1$ is a distance from the forward wall to the rearward wall,
   wherein the J shaped sipe has an extension distance $d_1$ that is the distance from the rearward wall to the farthest point of the teardrop from the rearward wall;
   wherein the teardrop has a diameter $d_2$;
   wherein:
   0.2 millimeters $\leq t_1 \leq$ 2.0 millimeters;
   0.0 millimeters $\leq t_2 \leq$ 1.0 millimeters;
   1.0 millimeters $\leq r_1 \leq$ 10 millimeters;
   $t_1 \leq d_2 \leq (4.0 \times t_1)$;
   $r_1 \leq d_1 \leq (1.1 \times (r_1 + d_2))$;
   $t_2 \leq t_1$.

2. The tread as set forth in claim 1, wherein:
   $t_1 = 0.6$ millimeters;
   $t_2 = 0.2$ millimeters;
   $r_1 = 3.0$ millimeters;
   $d_2 = 1.5$ millimeters.

3. The tread as set forth in claim 1, wherein the curved portion has the same cross-sectional shape and size along an entire axial width of the J shaped sipe.

* * * * *